(12) United States Patent
Liao et al.

(10) Patent No.: US 8,946,305 B2
(45) Date of Patent: Feb. 3, 2015

(54) METHOD FOR CROSSLINKING A COLLOID, AND CROSSLINKED COLLOID THEREFROM

(75) Inventors: Chun-Jen Liao, Taipei (TW); Wen-Hsi Wang, Taipei (TW); Ming-Chia Yang, Taipei (TW); Wei-Ju Liao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/608,927

(22) Filed: Sep. 10, 2012

(65) Prior Publication Data

US 2013/0165533 A1    Jun. 27, 2013

(30) Foreign Application Priority Data

Dec. 22, 2011  (TW) .............................. 100147904 A

(51) Int. Cl.
    *C08J 3/02*      (2006.01)
(52) U.S. Cl.
    USPC ........................................................... 516/99
(58) Field of Classification Search
    CPC   C08B 15/10; C08B 37/0063; C08B 37/0069;
              C08B 37/0072; C08G 2650/62; C08G
              2650/38; C08G 65/46; C08G 65/48
    USPC ........ 516/99, 100, 101, 102; 525/54.2, 54.21;
                                                  527/300, 312
    See application file for complete search history.

(56) References Cited

U.S. PATENT DOCUMENTS

| | | | |
|---|---|---|---|
| 4,716,224 A * | 12/1987 | Sakurai et al. ................ | 536/55.1 |
| 5,275,773 A | 1/1994 | Irie et al. | |
| 5,939,323 A | 8/1999 | Valentini et al. | |
| 6,031,037 A | 2/2000 | Ghafoor et al. | |
| 6,297,335 B1 | 10/2001 | Funk et al. | |
| 7,612,016 B2 | 11/2009 | Mertens et al. | |
| 7,670,509 B2 | 3/2010 | Jin et al. | |
| 2002/0086977 A1 | 7/2002 | Lai et al. | |
| 2003/0100739 A1 | 5/2003 | Tsai et al. | |
| 2004/0127698 A1 | 7/2004 | Tsai et al. | |

FOREIGN PATENT DOCUMENTS

| | | |
|---|---|---|
| DE | 19511769 A1 | 10/1995 |
| EP | 0926162 A1 | 6/1999 |
| JP | 57-117551 A | 7/1982 |
| JP | 57-198714 A | 12/1982 |
| JP | 2-178332 A | 7/1990 |
| JP | 7-270070 A | 10/1995 |
| JP | 8-134134 A | 5/1996 |
| JP | 2548302 B2 | 10/1996 |
| JP | 2557951 B2 | 11/1996 |
| JP | 11-156299 A | 6/1999 |
| JP | 11-240914 A | 9/1999 |
| JP | 2007-53165 A | 3/2007 |
| JP | 2010-73518 A | 4/2010 |
| TW | 477802 B | 3/2002 |
| TW | 498081 B | 8/2002 |
| TW | 574302 B | 2/2004 |
| TW | 593341 B | 6/2004 |
| TW | I251596 B | 3/2006 |
| TW | 200612991 | 5/2006 |
| TW | 200846373 A | 12/2008 |
| TW | 201012865 A1 | 4/2010 |
| TW | 201100474 A1 | 1/2011 |
| WO | WO 90/09401 A1 | 8/1990 |
| WO | WO 9633751 A1 | 10/1996 |
| WO | WO 2008/101538 A1 | 8/2008 |
| WO | WO 2009/063291 A1 | 5/2009 |
| WO | WO 2011/031402 A1 | 3/2011 |

OTHER PUBLICATIONS

Taiwanese Office Action, dated Sep. 12, 2013, for Taiwanese Application No. 100147904.
Alberto Migliore et al., "Viscosupplementation in the management of ankle osteoarthritis: a review", Arch Orthop Trauma Surg, (2011), pp. 139-147.
Brian Carpenter et al., "The Role of Viscosupplementation in the Ankle Using Hylan G-F 20", The Journal of Foot & Ankle Surgery, vol. 47, No. 5, Sep./Oct. 2008, pp. 377-384.
David H. Neustadt, "Intra-articular injections for osteoarthritis of the knee", Clevland Clinical Journal of Medicine, vol. 73, No. 10, Oct. 2006, pp. 897-911.
H.R. Oxley et al., "Macroporos hydrogels for biomedical applications: methodology and morphology", Biomaterials 1993, vol. 14, No. 14, pp. 1064-1072.
K. Pavelka et al., "Efficacy evaluation of highly purified intra-articular hyaluronic acid (Sinovial) vs Htlan G-F20 (Synvisc) in the treatment of symptomatic knee osteoarthritis. A double-blind, controlled, randomized, parallel-group non-inferiority study", Osteoarthritis and Cartlidge. 2011, pp. 1-7.
K.S. Kim et al., "Injectable hyaluronic acid-tyramine hyrdogels for the treatment of rheumatoid arthritis", Acta Biomaterialia, 7 (2011), pp. 666-674.
Lana P. Sturm et al., "A systematic review of dermal fillers for age-related lines and wrinkles", ANZ Journal of Surgery, 81 (2011), pp. 9-17.
Laure Gossec et al., "Do intra-articular therapies work and who will benefit most?", Best Practice & Research Clinical Rheumatology, vol. 20, No. 1, pp. 131-144, 2006.
Michael Karl Boettger et al., "Evaluation of long-term antinociceptive properties of stabilized hyaluronic acid preparation (NASHA) in an animal model of repetitive joint pain", Arthritis Research & Therapy 2011, pp. 1-11.
Ping I. Lee, "Effect of non-uniform initial drug concentration distribution on the kinetics of drug release from glassy hydrogel matrices", Polymer, Jul. 1984, vol. 25, pp. 973-978.

* cited by examiner

*Primary Examiner* — Robert Jones, Jr.
(74) *Attorney, Agent, or Firm* — Birch, Stewart, Kolasch & Birch, LLP

(57) ABSTRACT

The disclosure provides a method for crosslinking a colloid, including: (a) providing a colloid solution; (b) adding a crosslinking agent and solid particles to the colloid solution, wherein the amount of solid particles added is enough to convert the colloid solution into a solid mixture, and wherein a crosslinking reaction proceeds in the solid mixture; and (c) removing the solid particles from the solid mixture.

18 Claims, 1 Drawing Sheet

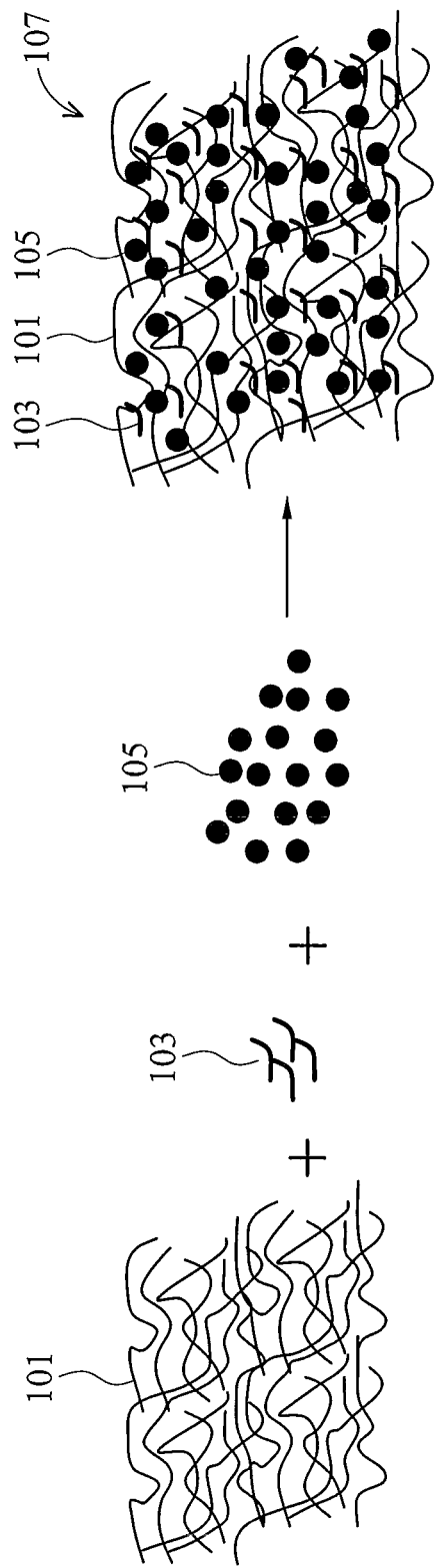

METHOD FOR CROSSLINKING A COLLOID, AND CROSSLINKED COLLOID THEREFROM

CROSS REFERENCE TO RELATED APPLICATIONS

This Application claims priority of Taiwan Patent Application No. 100147904, filed on Dec. 22, 2011, the entirety of which is incorporated by reference herein.

TECHNICAL FIELD

The present disclosure relates to a method for crosslinking a colloid, and in particular relates to a method for crosslinking, wherein the method crosslinks the colloid in solid phase by using solid particles.

BACKGROUND

Hydrogel is a "Water-based colloidal able to absorb water" formed by physically or chemically crosslinking a polymer chain segment. For hydrogel, a common conventional application in the biomedical field is contact lenses. In the 1960s, Wichterle and Lim et al. prepared a HEMA (hydroxyethyl methacrylate) hydrogel with a method of crosslinking to be used as contact lenses. Hydrogel is a kind of three-dimensional polymeric net structure, and has the property of swelling or diminution with adsorption or desorption of a solvent, and this kind of property means the nature of hydrogel is between a liquid and a solid.

Currently, in industry, the main method for crosslinking hydrogel comprises dissolving the powders of the hydrogel in a large volume of aqueous phase environment, dissolving a crosslinking agent in another large volume of aqueous phase environment, mixing the two products well to perform crosslinking, and after that, performing a step of drying or concentrating.

SUMMARY

One embodiment of the disclosure provides a method for crosslinking a colloid, comprising: (a) providing a colloid solution; (b) adding a crosslinking agent and solid particles to the colloid solution, wherein the amount of solid particles added is enough to convert the colloid solution into a solid mixture, and wherein a crosslinking reaction proceeds in the solid mixture; and (c) removing the solid particles from the solid mixture.

Another embodiment of the disclosure further provides a crosslinked colloid, formed by the method mentioned above.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 1 shows a schematic view of the method of an exemplary embodiment.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure provides a method for crosslinking a colloid which is a new technique for proceeding with a colloid crosslinking process. In the method of the one embodiment, by using solid particles as a dispersing agent, a colloid is converted into a solid phase and crosslinked in the solid phase environment to reach the effect of crosslinking a colloid.

The method for crosslinking a colloid of the one embodiment may comprise the following steps, but is not limited thereto.

See a schematic view of the method of the one embodiment in FIG. 1. First, a colloid solution 101 is provided. In one embodiment, the colloid solution may be at least formed by a colloid substance and a solvent. The colloid substance mentioned above may comprise, but not be limited to, hyaluronic acid, collagen, chitosan, chondroitin, water soluble cellulose or polyalcohol. Moreover, a suitable solvent may comprise water, alcohol, ether, ketone, benzene, ester or aldehyde, etc., but is not limited thereto.

Next, a crosslinking agent 103 and solid particles 105 are added to the colloid solution 101 mentioned above. It is noted that the amount of solid particles added needs to be enough to convert the colloid solution into a solid mixture 107, and a crosslinking reaction takes place in the solid mixture 107, wherein the crosslinking reaction results from the colloid solution and the crosslinking agent. A suitable crosslinking agent may comprise, for example, 1,4-butanediol diglycidyl ether (BDDE), N-hydroxysuccinimide (NHS), 1-hydroxybenzotriazole (HOBt), 2-chloro-1-methylpyridinium iodide (CMPI), 2-Chloro-4,6-dimethoxy-1,3,5-triazine (CDMT), carbonyldiimidazole, octenyl succinic anhydride (OSA), methacrylic anhydride, glutaraldehyde (GTA), 1-ethyl-3-(3-dimethylaminopropyl) carbodiimide (EDC), poly(ethylene glycol) diglycidyl ether (EX 810), ethylene sulfide, divinyl sulfone (DVS), poly(ethylene glycol)-diamine, dithiolthreitol (DTT), akyl halides or epoxides, etc. The solid particles mentioned above may comprise an inorganic salt particle, such as chloride, oxide, hydroxide, fluoride, nitrate, sulfate, nitrite, ammonium salt, phosphate, silicate, carbonate particles, etc., or an organic salt particle, such as oxalate particles, etc. In addition, in one embodiment, the particle size of the solid particles may be about 1-1000 µm. In another embodiment, the particle size of the solid particles may be about 10-100 µm.

In one embodiment, the amount of the colloid solution is about 1-10 parts by weight, the amount of the crosslinking agent is about 0.1-5 parts by weight and the amount of the solid particles is about 5-100 parts by weight.

In one embodiment, the step of adding a crosslinking agent and solid particles to the colloid solution may comprise:

(i) adding the crosslinking agent 103 into the colloid solution 101 and mixing well to start the crosslinking reaction first; and then (ii) adding the solid particles 105 into the colloid solution containing the crosslinking agent 103 to convert the colloid solution into a solid mixture 107, wherein the crosslinking reaction is continued in the solid mixture.

In one embodiment, after about 1-60 minutes of performing step (i), step (ii) is performed. Furthermore, in one embodiment, in step (ii), the crosslinking reaction is continued for about 1-24 hours.

In addition, in another embodiment, in the step of adding a crosslinking agent 103 and solid particles 105 to the colloid solution 101, the crosslinking agent 103 and the solid particles 105 are added to the colloid solution 101 at the same time. In this embodiment, the crosslinking reaction is continued for about 1-24 hours.

Finally, after forming the solid mixture 107 and the crosslinking reaction takes place therein, the solid particles are removed from the solid mixture. In one embodiment, the step of removing the solid particles from the solid mixture may comprise washing the solid mixture with an acid to remove the solid particles and to revert the solid mixture into a crosslinked colloid. An acid suitable for washing the solid mixture mentioned above may comprise, for example, hydrochloric acid, acetic acid, phosphoric acid or peroxy acid, etc. In this embodiment, after washing the solid mixture with an acid to remove the solid particles and to revert the solid mixture into a crosslinked colloid, the method of the present disclosure may further comprise washing the crosslinked colloid with a base to neutralize the crosslinked colloid. A suitable base may comprise sodium hydroxide, aluminum hydroxide, ammonia aqueous or alkaline hydroxide. In addition, in this embodiment, after washing the crosslinked colloid with a base to neutralize the crosslinked colloid, the method of the present disclosure may also further comprise washing the crosslinked colloid with a washing solution. A suitable washing solution may comprise ethyl alcohol, glycerol, neat soap, acetone, water, chloroform, dimethyl sulfoxide (DMSO), sodium hydroxide, hydrochloric acid or polyethylene glycol (PEG), etc. Furthermore, in the step of washing the crosslinked colloid with a washing solution, the weight ratio of the crosslinked colloid to the washing solution is about 1-20:1-20000.

Moreover, in another embodiment, the step of removing the solid particle from the solid mixture may comprise washing the solid mixture with an organic solvent to remove the solid particles. Suitable examples for the organic solvent may comprise ketone, polyalcohol, benzene or alkane, but are not limited thereto.

The present disclosure provides a crosslinked colloid formed by the method for crosslinking a colloid mentioned above. The crosslinked colloid formed by the method mentioned above has high degree of cross linking and uniformity and has raised viscoelastic properties (G' and G).

In one embodiment, the crosslinked colloid is formed by the method comprising the following steps:

A colloid solution is provided. In one embodiment, the colloid solution may be at least formed by a colloid substance and a solvent. The colloid substance mentioned above may comprise, but not be limited to hyaluronic acid, collagen, chitosan, chondroitin, water soluble cellulose or polyalcohol. In addition, a suitable solvent may comprise water, alcohol, ether, ketone, benzene, ester or aldehyde, etc., but is not limited thereto.

Then, a crosslinking agent and solid particles are added to the colloid solution mentioned above. It is noted that the amount of solid particles added needs to be enough to convert the colloid solution into a solid mixture, and a crosslinking reaction takes place in the solid mixture, wherein the crosslinking reaction results from the colloid solution and the crosslinking agent. A suitable crosslinking agent may comprise, for example, 1,4-butanediol diglycidyl ether (BDDE), N-hydroxysuccinimide (NHS), 1-hydroxybenzotriazole (HOBt), 2-chloro-1-methylpyridinium iodide (CMPI), 2-Chloro-4,6-dimethoxy-1,3,5-triazine (CDMT), carbonyldiimidazole, octenyl succinic anhydride (OSA), methacrylic anhydride, glutaraldehyde (GTA), 1-ethyl-3-(3-dimethylaminopropyl) carbodiimide (EDC), poly(ethylene glycol) diglycidyl ether (EX 810), ethylene sulfide, divinyl sulfone (DVS), poly(ethylene glycol)-diamine, dithiolthreitol (DTT), akyl halides or epoxides, etc. Moreover, the solid particles mentioned above may comprise an inorganic salt particle, such as chloride, oxide, hydroxide, fluoride, nitrate, sulfate, nitrite, ammonium salt, phosphate, silicate, carbonate particles, etc., or an organic salt particle, such as oxalate particles, etc. In addition, in one embodiment, the particle size of the solid particles may be about 1-1000 μm. In another embodiment, the particle size of the solid particles may be about 10-100 μm.

In one embodiment, in the method of the present disclosure, the amount of the colloid solution is about 1-10 parts by weight, the amount of the crosslinking agent is about 0.1-5 parts by weight and the amount of the solid particles is about 5-100 parts by weight.

In one embodiment, the step of adding a crosslinking agent and solid particles to the colloid solution may comprise:

(i) adding the crosslinking agent to the colloid solution and mixing well to start the crosslinking reaction first; and then
(ii) adding the solid particles to the colloid solution containing the crosslinking agent to convert the colloid solution into a solid mixture, wherein the crosslinking reaction is continued in the solid mixture.

Finally, after forming the solid mixture and the crosslinking reaction takes place therein, the solid particles are removed from the solid mixture.

Furthermore, the crosslinked colloid of the present method has various applications without specific limitation. In one embodiment, the crosslinked colloid may be used to prepare a joint injection.

Presently, conventional dispersing agents are powdered dispersing agents, mostly. For using powdered dispersing agents, the colloid has to be dried into powder first, and then mixed with the powdered dispersing agent, and that requires much work and time. However, the colloid formed by the foregoing is only for external application, as the dispersing agent is not able to be removed. Since the chemical properties of the conventional product will result in inflammation and abnormal sensations, the dispersing agent used in the colloid for injecting into a human body must be completely removed. In addition, if a crosslinked colloid is injected into a human body without first removing the dispersing agent, the problems of inflammatory response, such as redness and swelling, and heat pain, and abnormal sensations, and poison accumulation due to deposition of dispersing agent in the human body will result.

Considering the condition of applying the crosslinked colloid formed by the method of the present disclosure into a human body, in the method of the disclosure, after completing the crosslinking reaction, the solid particles used as the dispersing agent for the crosslinking reaction are removed from the crosslinked colloid. Although solid particles such as carbonate particles, etc. are not toxic to the human body, and are able to be absorbed and decomposed, if the solid particles such as carbonate particles are not removed, that will result in the final product not being uniform and bring deposition and agglomeration of the product to raise the problem of the crosslinked colloid being difficult to inject into the human body.

EXAMPLES

1. Preparation of Crosslinked Colloid

Preparation of an Injection Solution of Crosslinked Hyaluronic Acid

1.1 Summary of Method of Preparation

The method for preparing an injection solution of crosslinked hyaluronic acid comprised the following steps. (a) 0.25 g of hyaluronic acid or 0.25 g of powder of a salt thereof was added to 3.5 ml of 0.1 N NaOH solution to form a colloid; (b) 0.4 ml of 1,4-butanediol diglycidyl ether (BDDE) was added to the colloid of hyaluronic acid or a salt thereof to make 4 ml of the colloid and 1,4-butanediol diglycidyl ether led to a crosslinking reaction; (c) 7.5 g of carbonate particles (about 10-100 μm of particle size) were added to the product obtained from step (c) to convert the product into solid phase to crosslink the colloid, uniformly; (d) after crosslinking the product in solid phase for 20 hours, the solid phase product was immersed in 0.6 N hydrochloric acid to make the product white in color; (e) 0.6 N sodium hydroxide was added to the white product and reacted with the white product for about 3-5 minutes; (f) the product which was reacted with sodium hydroxide was immersed in 50% alcoholic solvent for 2 days (changing the solvent 3 times per day); (g) Finally, the product was immersed in d. d. water for 2 days (changing the solvent 3 times per day) and sterilized after being washed.

1.1.1 Preparation of Hydrochloric Acid Solution

First, 0.25 g of hyaluronic acid or 0.25 g of powder of salt thereof was added to 3.5 ml of 0.1 N NaOH solution and vortexed to promote dissolving to form a hyaluronic acid solution. The colloid solution was placed in a centrifuge and centrifuged at 3000 rpm for 3 minutes to eliminate the bubbles.

1.1.2 Crosslinked Process of Hydrochloric Acid 0.4 ml of 1,4-butanediol diglycidyl ether was added to 0.4 ml of the hydrochloric acid solution, and then 7.5 g of carbonate particles (about 10-100 μm of particle size) were added to the hydrochloric acid solution. By the addition of the carbonate particles, the crosslinking agent was uniformly dispersed in the hydrochloric acid solution with high viscosity such that the hydrochloric acid solution became a plastic solid like clay. Next, the solid was spread evenly on a release paper to form a film with a thickness of about 1 mm. Then, the film was scaled up by a zip lock bag, and placed and reacted in a 45° C. constant temperature water bath to allow the solid phase crosslinking reaction to proceed for 20 hours.

1.1.3 Removal of Solid Particles

After the crosslinking reaction was completed, the film was washed by an HCl solution to remove the added carbonate particles mentioned above and become a colloid form, and then washed by 500 ml PBS three times for 10 minutes each time.

1.1.4 Neutralization and Washing

After that, a 0.6 N NaOH solution was added to the colloid. It reacted with the colloid for about 3-5 minutes to make the pH value of the colloid neutral.

Afterward, the colloid was grinded through an 18 mesh sieve to crush the colloid.

50% ethanol alcohol was used as a washing solution with a weight ratio of the crosslinked colloid to washing solution of 1:200 to wash the crushed colloid mentioned above to perform a first stage washing process, and the wash solution was changed every 8 hours. Then, d. d. H$_2$O was used as a washing solution with a weight ratio of the crosslinked colloid to washing solution of 1:200 to wash the crushed colloid mentioned above to perform a second stage washing process, and the wash solution was changed every 4 hours. The washed colloid was concentrated by a stirred cell. Finally, the concentrated colloid was prepared to be isotonic and iso-osmolar for the human body.

2. Viscoelastic Property Tests by Using a Steady Shear Viscosity Meter d. d. H$_2$O was added to a lyophilized crosslinked hyaluronic acid to obtain a crosslinked hyaluronic acid sample with a concentration of 2%, and rheological characterization was performed on the crosslinked hyaluronic acid sample.

Before and after the injection by a 22-gauge needle, tests were performed on the foregoing crosslinked hyaluronic acid sample and other commercial products. At a control temperature of 25° C., a Bohlin VOR rheometer (Bohlin Reologi A B, Lund, Sweden) was utilized. A small-amplitude oscillatiry shear test was performed to test the time-dependent response for each sample to determine linear viscoelastic properties for each sample. The frequency range stretched from 0.05 Hz to 10 Hz. This range comprised the physiologic frequency for knees from 0.5 Hz (walking) varying to 10 Hz (running) (see Biomaterials 25 (2004) 4433-4445, and RHEOLOGY OF SYNOVIAL FLUID WITH AND WITHOUT VISCO-SUPPLEMENTS IN PATIENTS WITH OSTEOARTHRITIS: A PILOT STUDY by PETCHARATANA BHUANANTANONDH (September, 2009)). The results of the tests mentioned above are shown in Table 1.

TABLE 1

Comparison for viscoelastic properties of different samples

| Samples | Concentration of hydrochloric acid | Half-life | 0.5 Hz (walking) | | 5 Hz (running) | |
|---|---|---|---|---|---|---|
| | | | G' | G" | G' | G" |
| The crosslinked colloid of the present disclosure | 2% | — | 1276 | 112 | 1383 | 192 |
| Durolane (Q-med) | 2% | 4 weeks | 341 | 58 | 406 | 78 |
| Synvisc (Genzyme) | 0.8% | about 9 days | 100 | 24 | 126 | 21 |
| Artz (SEIKAGAKU corp.) | 1.0% | about 24 hours | 0.9 | 4.5 | 7.3 | 14 |
| Synovial Fluid of 18-27 year old | — | — | NA | NA | 117 ± 13 | 45 ± 8 |

NA: Unable to be obtained

According to Table 1, compared to commercial products, the crosslinked colloid of the present disclosure has better viscoelastic properties.

Moreover, the crosslinked hydrochloric acid with high viscoelasticity formed from the present disclosure not only prolongs the time for affecting the dermis, but also has the effect of raising the ability to repair deep wrinkles and numerous fine grains. In addition, joint injections prepared by the crosslinked hydrochloric acid with high viscoelasticity formed from the present disclosure have the ability to cushion and prevent shocks, and are capable of prolonging the time for decomposing in the body.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for crosslinking a colloid, comprising:
   (a) providing a colloid solution;
   (b) adding a crosslinking agent and solid particles to the colloid solution, wherein the amount of solid particles added is enough to convert the colloid solution into a solid mixture, and wherein a crosslinking reaction proceeds in the solid mixture; and
   (c) removing the solid particles from the solid mixture, wherein step (c) comprises washing the solid mixture with an acid to remove the solid particles and to revert the solid mixture into a crosslinked colloid, wherein the acid comprises hydrochloric acid, acetic acid, phosphoric acid or peroxy acid.

2. The method for crosslinking a colloid as claimed in claim 1, wherein the amount of the colloid solution is about 1-10 parts by weight, the amount of the crosslinking agent is about 0.1-5 parts by weight and the amount of the solid particles is about 5-100 parts by weight.

3. The method for crosslinking a colloid as claimed in claim 1, wherein the colloid solution is at least formed from a colloid substance and a solvent.

4. The method for crosslinking a colloid as claimed in claim 3, wherein the colloid substance comprises hyaluronic acid, collagen, chitosan, chondroitin, water soluble cellulose or polyalcohol.

5. The method for crosslinking a colloid as claimed in claim 3, wherein the solvent comprises water, alcohol, ether, ketone, benzene, ester or aldehyde.

6. The method for crosslinking a colloid as claimed in claim 1, wherein step (b) comprises:
   (i) adding the crosslinking agent to the colloid solution and mixing to start the crosslinking reaction; and
   (ii) adding the solid particles to the colloid solution containing the crosslinking agent to convert the colloid solution into a solid mixture, wherein the crosslinking reaction is continued in the solid mixture.

7. The method for crosslinking a colloid as claimed in claim 6, wherein after about 1-60 minutes of performing step (i), step (ii) is performed.

8. The method for crosslinking a colloid as claimed in claim 6, wherein in step (ii), the crosslinking reaction is continued for about 1-24 hours.

9. The method for crosslinking a colloid as claimed in claim 1, wherein the crosslinking agent and solid particles are added to the colloid solution at the same time.

10. The method for crosslinking a colloid as claimed in claim 9, wherein the reaction time for the crosslinking reaction is about 1-24 hours.

11. The method for crosslinking a colloid as claimed in claim 1, wherein the crosslinking agent comprises 1,4-butanediol diglycidyl ether (BDDE), N-hydroxysuccinimide (NHS), 1-hydroxybenzotriazole (HOBt), 2-chloro-1-methylpyridinium iodide (CMPI), 2-Chloro-4,6-dimethoxy-1,3,5-triazine (CDMT), carbonyldiimidazole, octenyl succinic anhydride (OSA), methacrylic anhydride, glutaraldehyde (GTA), 1-ethyl-3-(3-dimethylaminopropyl) carbodiimide (EDC), poly(ethylene glycol) diglycidyl ether (EX 810), ethylene sulfide, divinyl sulfone (DVS), poly(ethylene glycol)-diamine, dithiolthreitol (DTT), akyl halides or epoxides.

12. The method for crosslinking a colloid as claimed in claim 1, wherein the solid particles comprise chloride, oxide, hydroxide, fluoride, nitrate, sulfate, nitrite, ammonium salt, phosphate, silicate, carbonate particles or oxalate particles.

13. The method for crosslinking a colloid as claimed in claim 1, wherein the particle size of the solid particles is about 1-1000 μm.

14. The method for crosslinking a colloid as claimed in claim 1, after step (c), further comprising:
   (d) washing the crosslinked colloid with a base to perform a neutralization reaction.

15. The method for crosslinking a colloid as claimed in claim 14, wherein the base comprises sodium hydroxide, aluminum hydroxide, ammonia aqueous or alkaline hydroxide.

16. The method for crosslinking a colloid as claimed in claim 14, after step (d), further comprising:
   (e) washing the crosslinked colloid with a washing solution.

17. The method for crosslinking a colloid as claimed in claim 16, wherein the washing solution comprises ethyl alcohol, glycerol, neat soap, acetone, water, chloroform, dimethyl sulfoxide (DMSO), sodium hydroxide, hydrochloric acid or polyethylene glycol (PEG).

18. The method for crosslinking a colloid as claimed in claim 17, wherein a weight ratio of the crosslinked colloid to the washing solution is about 1-20:1-20000.

* * * * *